J. HARTIN.
DISTRIBUTING APPARATUS FOR BEER, &c.
No. 11,314. Reissued Mar. 21, 1893.
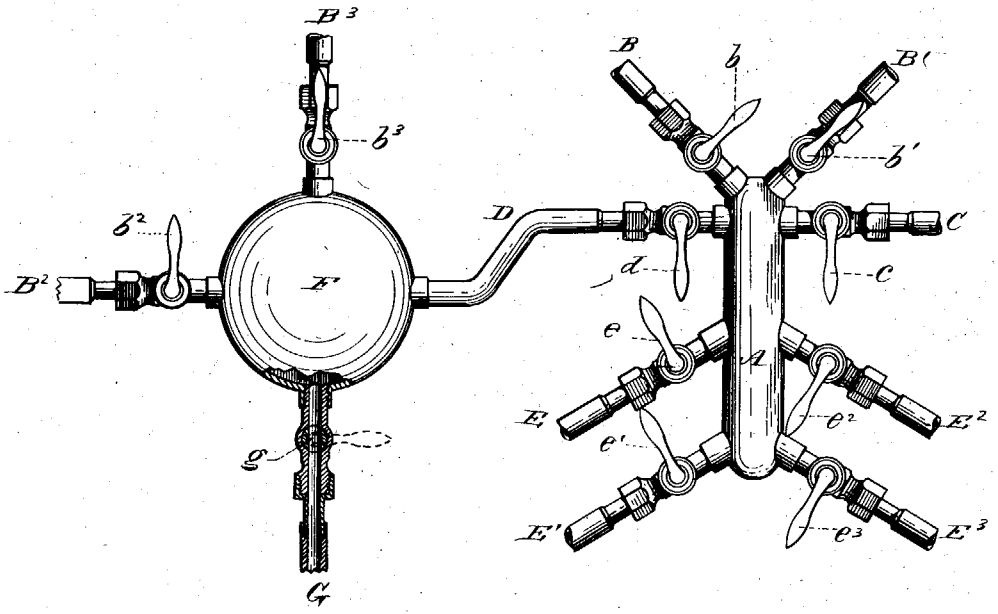
Witnesses
A. F. Acton
E. L. Harlow
Inventor
John Hartin
per J. S. Rush
Atty

UNITED STATES PATENT OFFICE.

JOHN HARTIN, OF BOSTON, MASSACHUSETTS.

DISTRIBUTING APPARATUS FOR BEER, &c.

SPECIFICATION forming part of Reissued Letters Patent No. 11,314, dated March 21, 1893.

Original No. 464,021, dated December 1, 1891. Application for reissue filed October 12, 1892. Serial No. 448,706.

*To all whom it may concern:*

Be it known that I, JOHN HARTIN, a citizen of the United States, residing at Boston, in the county of Suffolk and Commonwealth of Massachusetts, have invented certain new and useful Improvements in Distributing Apparatus for Beer, &c., of which the following is a full specification.

My invention consists of an improved apparatus especially designed for the use and convenience of bar-tenders for economically distributing lager-beer, ale, &c., from a single barrel at a time to various parts of the bar.

In places where the extent of the business is such as to keep a number of bar-tenders constantly busy in serving beer, &c., to customers, it has hitherto been the practice to run a separate pipe from the cellar or store-room wherein the beer is stored to each bar-tender, each of said pipes connecting with a separate barrel. If at night these various barrels were not empty, the beer that still remained therein next morning would by exposure to the air over night be inferior in quality and of little or no value; hence the wastefulness of this system. Moreover, when a particular barrel was emptied during the day it would be necessary for the bar-tender whom that barrel supplied to wait until the empty barrel was disconnected and a fresh barrel connected to his pipe before he could resume serving out the beer. By my improved apparatus all such inconvenience is avoided and the quantity of waste liquor is reduced to a minimum, one barrel at a time serving to supply all the bar-tenders, as hereinafter described in detail.

The accompanying drawing illustrates in plan view a form of distributing apparatus embodying my invention.

A is a reservoir or close receptacle into which the beer or other liquid flows and from which in turn it is distributed to various parts of the bar. At or near one end of the reservoir A are coupled thereto the faucets $b$ $b'$ to connect with the interior of said reservoir, these faucets being joined to the supply-pipes B B′, respectively. The supply-pipes B B′ run into the store-room or cellar and are each connected with a separate beer-barrel. But one of these barrels is to be used at a time however, the purpose of the two being to enable an attendant to open communication without any delay with the second barrel when the first is empty.

E, E′, $E^2$ and $E^3$ are distributing-pipes connecting with faucets $e$, $e'$ $e^2$ and $e^3$ respectively, which faucets connect in turn with the reservoir A. Any number of these distributing-pipes may be employed leading to various parts of the bar, according to the number of bar-tenders required.

F is a globe or other close chamber from which for various purposes air under pressure is distributed to different parts of the system. The air-supply pipe G, which connects through the faucet $g$ with the interior of the air-chamber, also connects with the air-pump with which the bar-room is supplied.

$B^2$ and $B^3$ are two outlet-pipes from the chamber F, controlled by the faucets $b^2$ and $b^3$ respectively. These pipes pass into the store-room where the beer-barrels are kept and are connected with the barrels which supply the pipes B and B′, the pipe $B^3$ being connected with the barrel from which the pipe B′ leads, and the pipe $B^2$ being connected with the barrel from which the pipe B leads. The pipes $B^2$ and $B^3$ thus supply the air-pressure for the flow of the beer.

If at any time four bar-tenders are required, all four of the distributing-faucets $e$, $e'$ $e^2$ $e^3$ are opened, allowing the liquor to flow through all the pipes E, E′ $E^2$ $E^3$. If only one bar-tender is required, three of the faucets $e$ $e'$ $e^2$ $e^3$ are closed, the distribution being thus regulated at will. When, as herein shown, the beer flows into the reservoir A through the supply-pipe B′, the faucet $b$ is closed and the faucet $b'$ is open, the air-faucet $b^3$, which admits air into the barrel from which the pipe B′ leads, being open, and the other air-supply faucet $b^2$ being closed. When the beer is exhausted from the one barrel, the faucets $b'$ and $b^3$ are turned off and the faucets $b$ and $b^2$ turned on, which immediately causes beer from the second barrel to fill the reservoir A through the pipe B. While beer is being drawn from one barrel an attendant in the store-room preferably sees that the other barrel, if empty, is disconnected and a full barrel connected on in its place ready for use. In this manner, even if a large number of bar-tenders are employed, the beer that remains over at night is contained in one barrel only, and hence leaves much less to be wasted than if a separate barrel supplied each man, as formerly.

I have also provided a ready and convenient means for cleaning out the apparatus, as is necessary, every morning before starting in.

D is a pipe leading from the air-chamber F to the supply end of the reservoir A, communication with said reservoir being had through the faucet *d*.

C is a water-pipe also communicating with the supply end of the reservoir through the faucet *c*. When it is desired to clean out the apparatus, the faucets *b* and *b'* being closed, the faucets *e e' e²* and *e³* are opened and also the faucets (not shown) at the outer ends of the distributing-pipes E E' E² and E³. The air-faucet *d* is then opened which causes the air to force out of the reservoir and pipes all liquor that may be contained therein. The air-faucet *d* is then closed and the water-faucet *c* opened, which causes the water to flow through the system, thus cleaning it thoroughly. By closing the water-faucet *c* and again opening the air-faucet *d* the water is driven out of the system by the pressure of the air, and when the faucet *d* is finally closed the distributing system, thoroughly cleansed, is once more ready for work.

All the faucets herein shown being preferably within easy reach of one attendant, the system is very convenient whether at any time one man or a dozen are employed. By varying the position of the air-faucet handles the air-pressure may be varied at will, as will readily be seen.

The apparatus here shown is also useful in mixing liquors—as, for instance, lager and ale—to form what is known as "musty ale." In this case one supply-pipe B connects with a barrel of lager-beer, while the other B' connects with a barrel of ale. Both faucets *b b'* are opened more or less, as desired, allowing the two liquors to mingle in any desired proportion in the reservoir A, from which it may flow through any number of distributing pipes to various parts of the bar.

When desired, a number of distributing-reservoirs A, with their connecting-pipes may be employed, each of such systems connecting by a pipe D with a single air-chamber F. In this case two air-supply pipes B² B³ would be necessary for each of such systems, and all could in like manner be controlled by a single attendant.

I claim—

1. In a distributing apparatus for beer &c., the combination with a reservoir, of one or more faucet-controlled supply pipes, each of which connects said reservoir with a separate source of liquor supply adapted to be in turn connected with said reservoir, and one or more faucet-controlled distributing pipes directly connected to said reservoir and connecting it with various parts of the bar, substantially as and for the purpose described.

2. In a distributing apparatus for beer &c., a reservoir provided with one or more faucet-controlled supply pipes each of which connects said reservoir with a separate source of liquor supply adapted to be in turn connected with said reservoir, and one or more faucet-controlled distributing pipes directly connected to said reservoir and connecting it with various parts of the bar, in combination with an air chamber connected with a suitable source of air supply and having separate faucet-controlled pipes connecting said air chamber with the sources of liquor supply, arranged and operating substantially as and for the purpose described.

3. A distributing apparatus for beer having a reservoir with suitable supply and distributing pipes and provided with means for cleaning the same when not in use, consisting of a faucet controlled air-pipe and a faucet controlled water-pipe whereby said reservoir and pipes are first blown out by compressed air and then washed out by water, substantially as set forth.

In testimony whereof I have hereunto set my hand this 10th day of October, A. D. 1892.

JOHN HARTIN.

In presence of—
A. F. ACTON,
E. L. HARLOW.